United States Patent
Balk et al.

(10) Patent No.: US 9,859,532 B2
(45) Date of Patent: Jan. 2, 2018

(54) BATTERY MODULE AND METHOD INCORPORATING EXTERIOR CASING AND LINER

(75) Inventors: Mikhail S. Balk, Brown Deer, WI (US); Richard M. DeKeuster, Racine, WI (US); Binbin Fan, Shanghai (CN)

(73) Assignee: JOHNSON CONTROLS TECHNOLOGY LLC, Wilmington, DE (US)

( * ) Notice: Subject to any disclaimer, the term of this patent is extended or adjusted under 35 U.S.C. 154(b) by 1497 days.

(21) Appl. No.: 13/434,459

(22) Filed: Mar. 29, 2012

(65) Prior Publication Data
US 2012/0247107 A1 Oct. 4, 2012

Related U.S. Application Data

(60) Provisional application No. 61/516,214, filed on Mar. 31, 2011.

(51) Int. Cl.
*H01M 2/02* (2006.01)
*H01M 2/10* (2006.01)

(52) U.S. Cl.
CPC ......... *H01M 2/0217* (2013.01); *H01M 2/028* (2013.01); *H01M 2/0262* (2013.01); *H01M 2/0285* (2013.01); *H01M 2/1077* (2013.01); *H01M 2220/20* (2013.01); *Y10T 29/49108* (2015.01)

(58) Field of Classification Search
CPC ...... H01M 10/04; H01M 2/10; H01M 2/0217; H01M 2/0262; H01M 2/028; H01M 2/0285; H01M 2/1077; H01M 2220/20; Y10T 29/49108
See application file for complete search history.

(56) References Cited

U.S. PATENT DOCUMENTS

| | | | | |
|---|---|---|---|---|
| 5,343,970 A | * | 9/1994 | Severinsky | B60K 6/387 180/165 |
| 5,392,873 A | * | 2/1995 | Masuyama | B60R 16/04 180/68.5 |
| 5,534,364 A | | 7/1996 | Watanabe et al. | |
| 5,567,542 A | * | 10/1996 | Bae | H01M 2/1016 429/120 |

(Continued)

FOREIGN PATENT DOCUMENTS

| | | |
|---|---|---|
| CN | 101504973 A | 8/2009 |
| EP | 2086035 A1 | 8/2009 |

OTHER PUBLICATIONS

International Search Report and Written Opinion for PCT No. PCT/US2012/031678 dated May 21 2012; 9 pages.
CN Office Action dated Jun. 3, 2015.

*Primary Examiner* — Gregg Cantelmo
(74) *Attorney, Agent, or Firm* — Fletcher Yoder, P.C.

(57) ABSTRACT

A battery module includes a rigid external casing made, for example, of a metallic sheet material. Securement features, tabs, and so forth may be formed in the material of the casing. The casing may be made by stamping and bending metallic sheet. A liner is disposed in the casing, and one or more battery cells are disposed in the liner. The liner may comprise an insulative sheet material that is cut and folded to generally conform to the casing. The structure may include a bus bar assembly, compression members, a thermal component and other structural and functional elements.

32 Claims, 6 Drawing Sheets

(56) References Cited

U.S. PATENT DOCUMENTS

| | | | | |
|---|---|---|---|---|
| 5,585,204 A * | 12/1996 | Oshida | ............... | H01M 10/443 |
| | | | | 429/120 |
| 6,007,937 A * | 12/1999 | Ruiz Rodriguez | . | B60L 11/1874 |
| | | | | 429/120 |
| 6,569,556 B2 * | 5/2003 | Zhou | ................... | H01M 2/1083 |
| | | | | 429/120 |
| 2009/0047574 A1* | 2/2009 | Hellmann | ........... | H01M 2/1061 |
| | | | | 429/121 |
| 2011/0262801 A1* | 10/2011 | Schwab | ................... | B60K 1/04 |
| | | | | 429/163 |

* cited by examiner

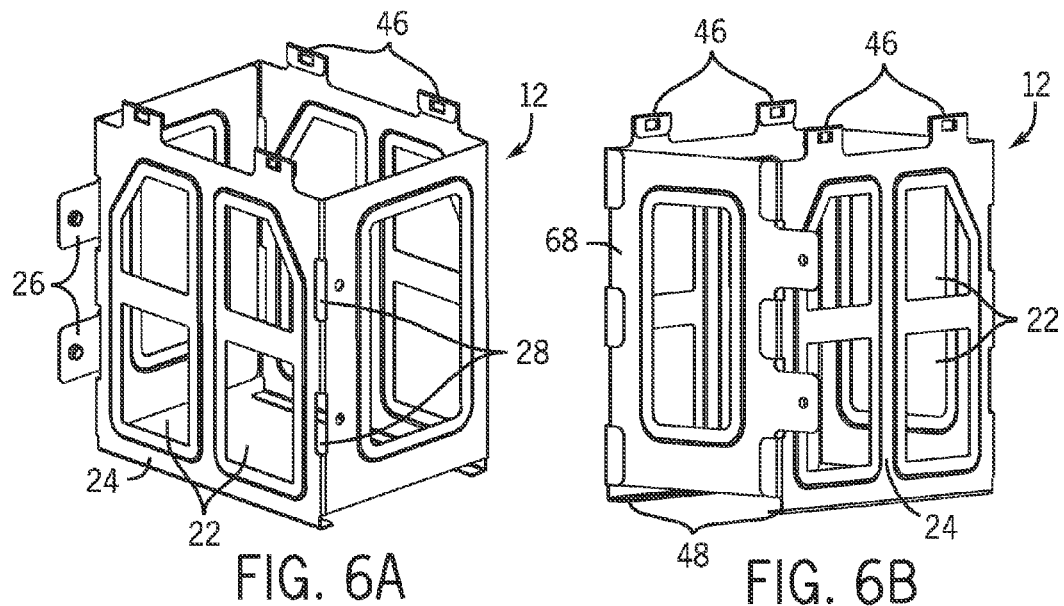
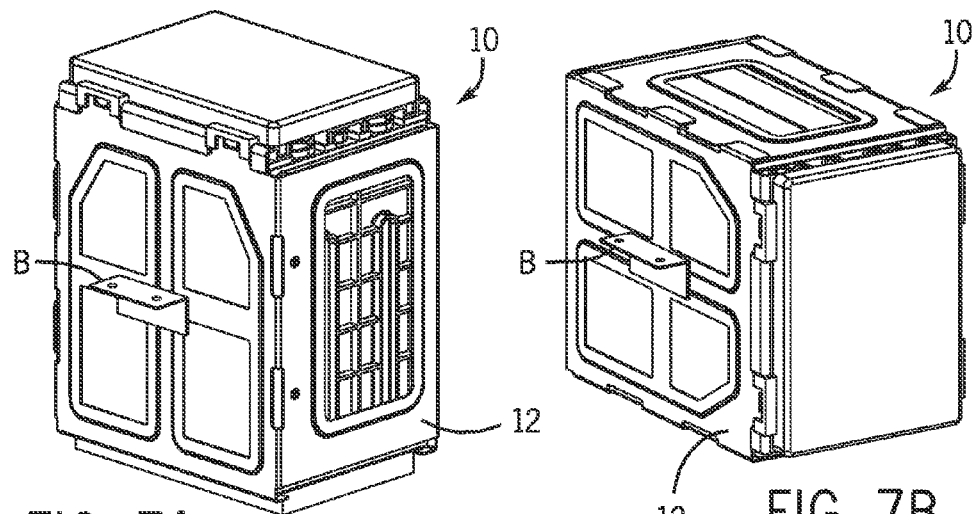
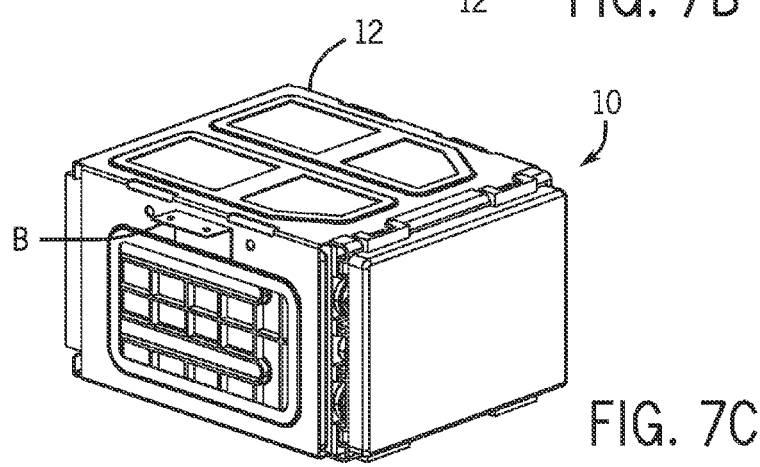

BATTERY MODULE AND METHOD INCORPORATING EXTERIOR CASING AND LINER

CROSS REFERENCE TO RELATED APPLICATIONS

This application claims priority from and the benefit of U.S. Provisional Application Ser. No. 61/516,214, entitled "Battery Module and Clamping System", filed Mar. 31, 2011, which is hereby incorporated by reference.

BACKGROUND

The present application relates generally to the field of batteries and battery systems. More specifically, the present application relates to batteries and battery systems that may be used in vehicular and other applications, and that can be easily adapted to various mounting and securement requirements of the applications.

A wide range of applications exist for battery systems, particularly ones utilizing new and evolving energy storage technologies. For example, vehicles using electric power for all or a portion of their motive power (e.g., electric vehicles (EVs), hybrid electric vehicles (HEVs), plug-in hybrid electric vehicles (PHEVs), and the like, collectively referred to as "electric vehicles") may provide a number of advantages as compared to more traditional gas-powered vehicles using internal combustion engines. For example, electric vehicles may produce fewer undesirable emission products and may exhibit greater fuel efficiency as compared to vehicles using internal combustion engines (and, in some cases, such vehicles may eliminate the use of gasoline entirely, as is the case of certain types of PHEVs).

One area of improvement that continues to develop is in the area of battery chemistry. Early electric vehicle systems employed nickel-metal-hydride (NiMH) batteries as a propulsion source. Over time, different additives and modifications have improved the performance, reliability, and utility of NiMH batteries. More recently, manufacturers have begun to develop lithium-ion batteries that may be used in electric vehicles. There are several advantages associated with using lithium-ion batteries for vehicle applications. For example, lithium-ion batteries have a higher charge density and specific power than NiMH batteries. Stated another way, lithium-ion batteries may be smaller than NiMH batteries while storing the same amount of charge, which may allow for weight and space savings in the electric vehicle (or, alternatively, this feature may allow manufacturers to provide a greater amount of power for the vehicle without increasing the weight of the vehicle or the space taken up by the battery system).

One continuing issue in battery design involves the configuration of mounting structures to hold the batteries. In vehicular applications, for example, the mounting and fastening structures may be dictated at least in part by the location and placement of the batteries in the vehicle. Moreover, due to the wide range of different vehicle offerings, these may vary greatly, with differences being demanded between vehicle manufacturers as well as between vehicles offered by the same manufacturers. While various form factors and configurations have been developed, these are very large in number, and specialized mounting is often still required. Still further, evolving battery technologies, particularly for EVs, HEVs and PHEVs will typically incorporate multiple batteries or battery groups, each of which may comprise multiple combined or separate cells. The dimensions and placement of these are not yet set, and adaptation will certainly be required for many years to come.

There is a continuing need, therefore, for battery systems that can be more readily adapted to various mounting and securement requirements.

SUMMARY

The present invention provides battery system designs that respond to such needs. The system may be adapted to a wide range of settings, and is particularly well suited to vehicular applications. Moreover, the system may be configured to conform to different mounting requirements, and may be economically re-configured in relatively small runs owing at least in part to the system components, their materials and design options.

In accordance with certain aspects of the invention, a battery module comprises a metallic external casing, an insulative, sheet-like liner disposed in the external casing, and at least one energy storage cell disposed in the liner. The casing may be made by stamping and bending, and may incorporate securement features, apertures for weight reduction, and so forth. The liner may be made by cutting and folding an insulative sheet material.

In accordance with another aspect, the invention provides a battery module that comprises a stamped and bent metallic external casing, and an insulative, sheet-like liner disposed in the external casing. A plurality of energy storage cells are disposed in the liner. A bus structure is configured to interface with terminals of the energy storage cells to at least partially combine outputs of the energy storage cells. A compression element is disposed between the casing and the energy storage cells and configured to urge the energy storage cells towards one another.

The invention also provides a method for making a battery module. In general, the method comprising forming metallic external casing, inserting an insulative, sheet-like liner into the external casing, and inserting at least one energy storage cell into the liner.

DRAWINGS

FIGS. 6A and 6B are perspective views of the metal casing illustrating various design features that may be incorporated into a casing;

FIGS. 7A, 7B and 7C are perspective views of the battery module illustrated with brackets in different positions to allow the module to be mounted in conformance with various support configurations, form factors, and so forth.

DETAILED DESCRIPTION

Figure 1:
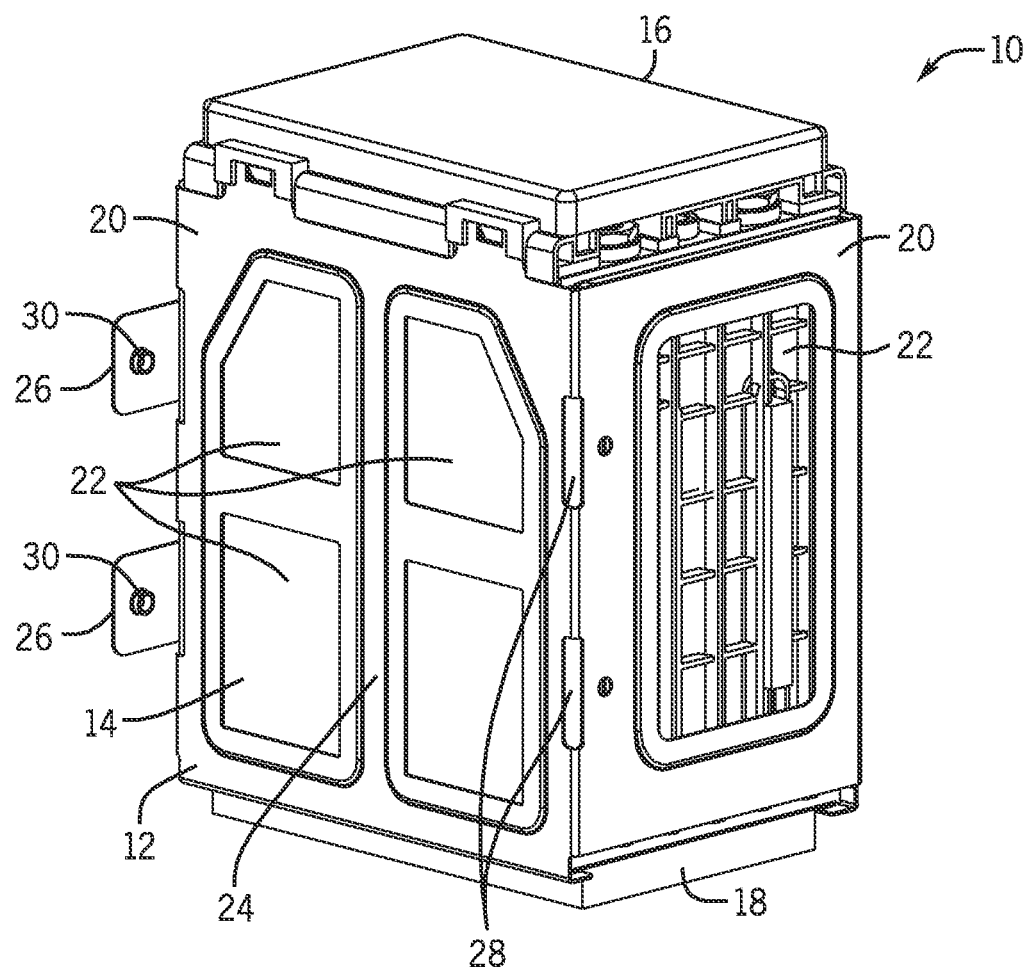
FIG. 1 is a perspective view of an exemplary battery module incorporating a metallic casing in liner in accordance with aspects of the present disclosure.

Turning now to the drawings, and referring first to FIG. 1, a battery module 10 is illustrated as will be used when storing energy for various purposes, such as powering vehicle starting, vehicle components, and so forth. It should be noted, however, that similar or other designs utilizing the teachings of the present disclosure may be envisaged, and these may be found in vehicular and other applications. The battery module 10 illustrated in FIG. 1 may be designed to operate alone or in combination with similar battery modules in a grouping, particularly where additional voltage, current and/or battery life are desired. The battery module illustrated includes a casing 12 that generally surrounds a liner 14. The casing may be made of various materials, but in a presently contemplated embodiment is made of a metal, such as steel or aluminum. In certain presently contemplated embodiments, the casing material has a nominal thickness of approximately 1 mm, or between approximately 0.5 and 1.5 mm, although other thicknesses may be used. The casing, as described more fully below, may be formed by various operations, such as stamping, bending and so forth, and may incorporate a range of features that facilitate protection of the internal components of the battery module and mechanical securement of the battery module in the desired application.

The liner 14 is advantageously made of a sheet-like material, such as polypropylene. Other suitable materials may include, without limitation polyethylene terephthalate (Mylar), and other materials that allow for insulation of the battery cells. In certain presently contemplated embodiments, the liner material has a nominal thickness of approximately 0.4 mm, or between approximately 0.2 and 1.0 mm, although other thicknesses may be used. The liner is wrapped around certain internal components, including one or more battery cells as described more fully below. While the rigid casing 12 allows for structural integrity and fastening the battery module in the desired application, the liner 14 provides a level of insulation of the internal components and protection from the environment. These components will be described more fully below.

The illustrated embodiment includes a cover 16 which is removable from the assembly. A cold plate 18 is mounted on a bottom surface. In practice, the cold plate may receive gases or liquid coolant to cool the cells within the battery module. It should be recognized, however, that although reference is made to a "cool plate", the same module may be used to heat the components when desired. Moreover, fins, or other heat transfer structures may be incorporated into the plate, such as for convective cooling, particularly in vehicular applications when a vehicle is moving. In general, then, a thermal transfer component of this type may be active or passive.

The casing 12 has sides 20 which surround the liner 14 and the internal components of the battery module. Conveniently, owing to the facility of fabricating the casing, apertures or openings 22 may be formed at various locations allowing structural rigidity while permitting reduction in weight. Where provided, such apertures may allow exposure of the liner 14 while not compromising the integrity of the liner. Ribs, as generally represented by reference numeral 24 may be formed at various locations in the sides to improve the rigidity of the casing. The use of such apertures or openings, and ribs creates a cage-like structure that provides for structural support and compression, while allowing for a wide range of mounting options. Moreover, mounting structures may be formed that facilitate fastening of the battery module into the desired application, as well as for interfacing similar battery modules with one another. In the illustrated embodiment, for example, tabs 26 extend from one or more of the sides, and these may be secured to surrounding structures when the battery module is mounted. Moreover, in the illustrated embodiment openings 28 are formed in a corner of the casing in positions to receive the tabs 26 of a self-similar battery module, allowing the battery modules to be mechanically coupled to one another, while reducing inventory for casings of different designs. That is, the casing may conveniently be designed to allow for bilateral, mirror-image or other types of symmetry such that reversal of the mounting orientation may allow one casing to easily interface and be secured to another. Various apertures, threaded and un-threaded may be provided for securement, as indicated by reference numeral 30.

Figure 2:
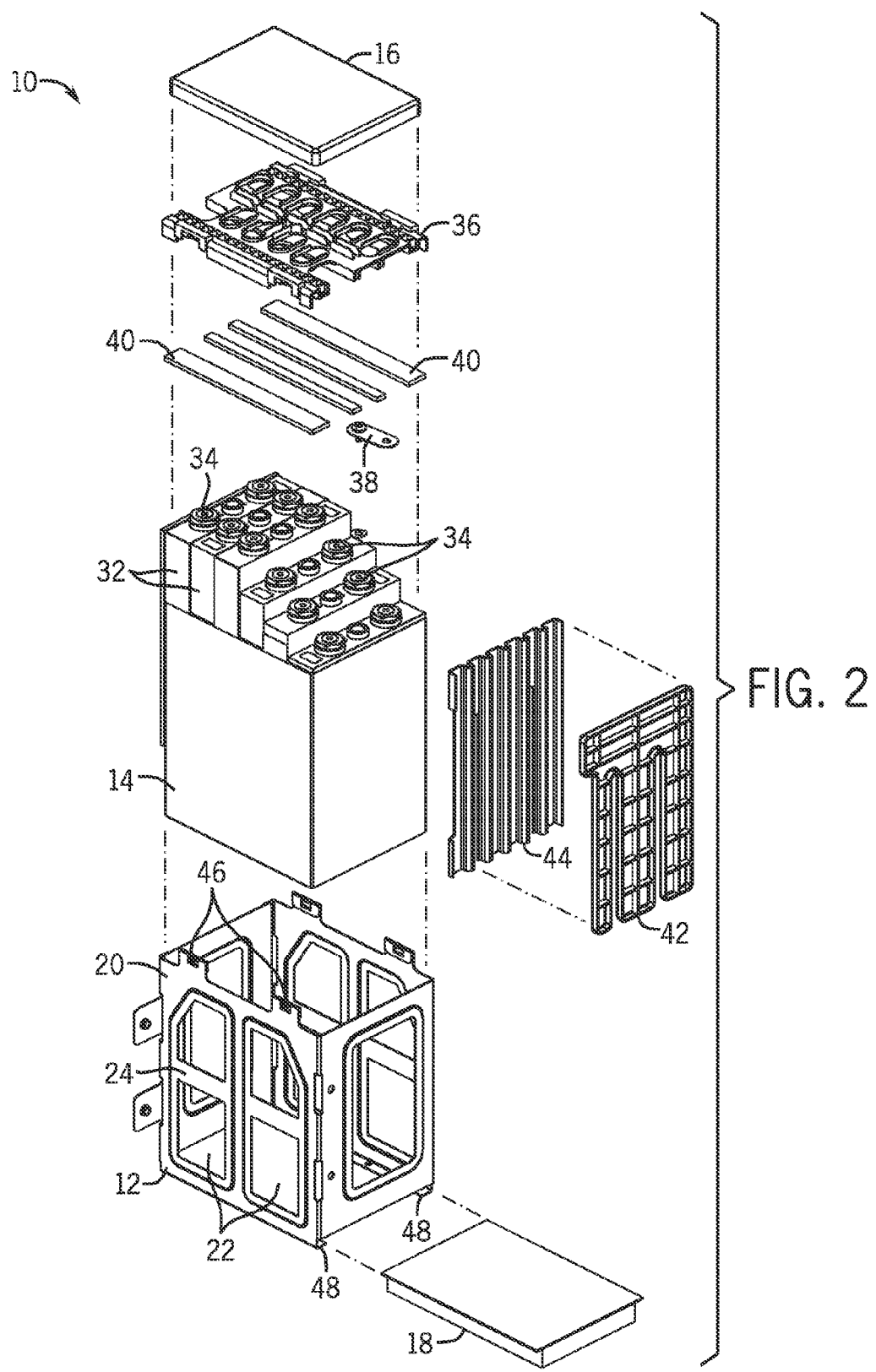
FIG. 2 is an exploded view of the battery module of FIG. 1 illustrating certain of the structural and functional components of the module.

FIG. 2 illustrates the same battery module as FIG. 1, but in exploded view to show certain of the internal components. As mentioned above, the casing 12 forms a shell that will surround the liner 14 and the internal components of the module once assembled. At the heart of the module, one or more cells 32 are provided that may be interlinked to offer the desired voltage and current to the application. In the illustrated embodiment, these cells may comprise any known or later developed energy storage technology, such as glass mat technologies, lithium-ion technologies, nickel-metal-hydride technologies, lithium polymer technologies, lithium iron phosphate technologies, and so forth. The various lithium-based technologies may be referred to collectively as "lithium battery technologies", and are particularly well suited for use in the module. Certain embodiments of the module are particularly suited to cell designs and technologies that exhibit limited expansion and consequent forces associated with changes in their state of charge. Moreover, the module is particularly suited for use with prismatic storage cells that are capable of being stacked as shown and described. Each cell has terminals 34 that allow for extraction of stored energy within the cell and for combination with the output of other cells in the module where desired. A bus bar assembly 36 fits atop the cells and allows for multiple functions, including alignment of the cells, combination of outputs of multiple cells, and so forth. In a presently contemplated embodiment, moreover, various sensing mechanisms may be incorporated into the bus bar assembly, such as voltage sensors, current sensors, temperature sensors, and so forth. Bus bars 38 allow for interconnection of the terminals of the cells, only one bus bar being shown in the illustrated embodiment.

The internal components of the battery module are held in place and tightly grouped, in the illustrated embodiment, by a series of mechanical components that urge the cells and other components toward one another. In the embodiment illustrated in FIG. 2, for example, pressure pads 40 are provided above the cells and sandwiched between the cells and the bus bar assembly 36. One or more shim elements 42 and 44 are also provided, in this case in positions that allow them to be placed and wedged between the stack of cells and one of the exterior walls of the casing 12. Various materials and mechanical arrangements for such shim elements may be envisaged, and their mechanical configuration will typically depend upon the physical arrangement of the casing, the liner, and the one or more cells in the module. In a presently contemplated arrangement, for example, at least one of these has a slightly tapered wedge form that progressively compresses the cells as it is inserted into the assembly. Finally, a series of securement tabs, indicated generally by reference numeral 46, may be provided in the casing that allow for compression of the assembly, such as when the bus bar assembly and/or cover is placed over the components described above. In the illustrated embodiment, moreover, the interaction of these tabs with the bus bar assembly and/or cover allow the cells to be urged downwardly such that they make a better thermal contact with the cool plate 18. The cool plate itself may be mounted in various manners, and in the illustrated embodiment is slidingly received by channels or grooves 48 formed by lower peripheral edges of the casing.

Figure 3:
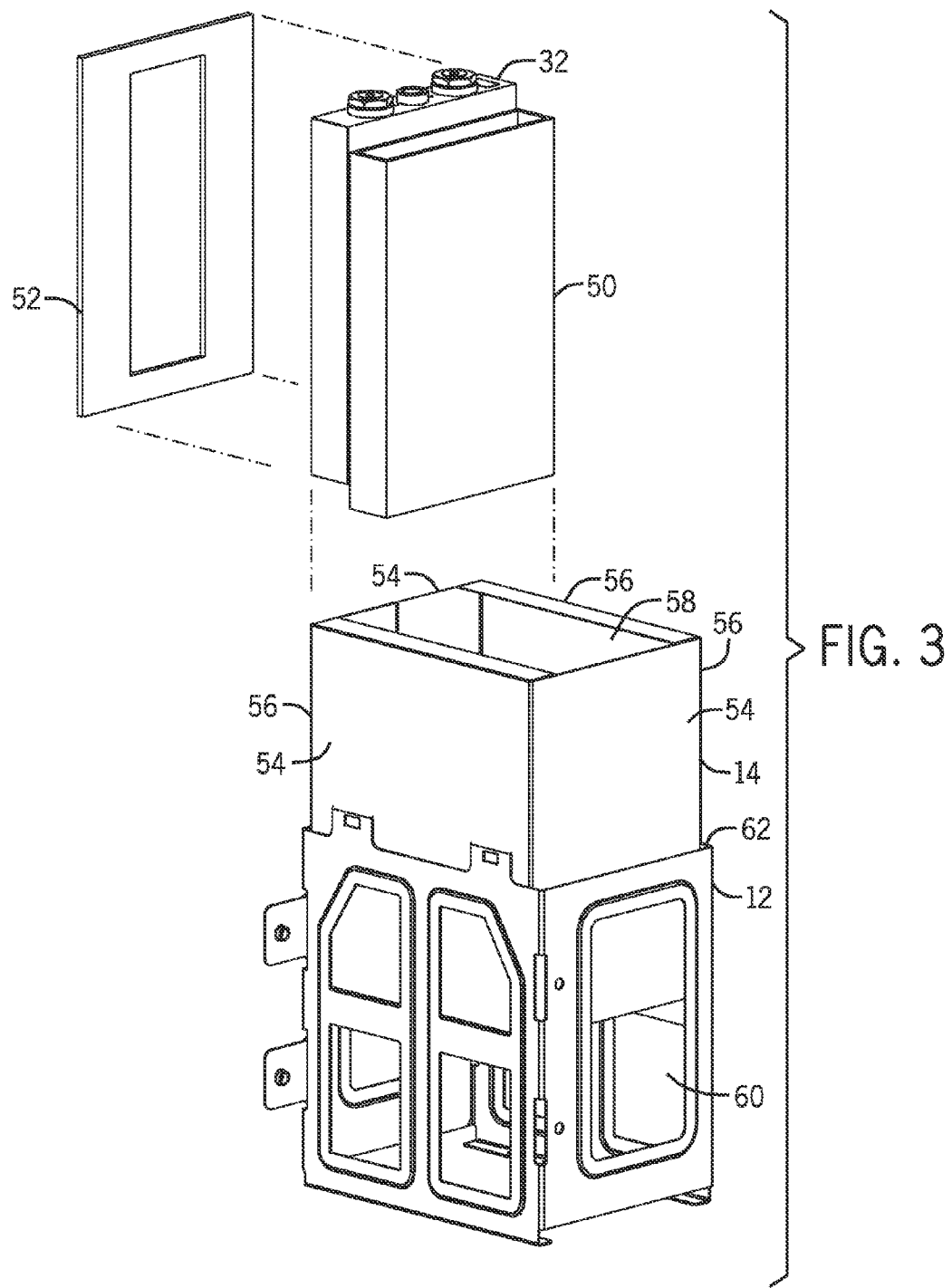
FIG. 3 is an exploded view of certain of the same components, including the casing and liner.

FIG. 3 is another exploded view of certain of the components described above. Here again, the outer shell or casing 12 is illustrated with the liner 14 partially inserted, but with the battery cells, shims, and so forth removed. The casing in this embodiment has open upper end, although other sides of the casing could also be made open, and then closed with various structures, doors, panels, and so forth to facilitate access to the internal components, assembly of the module, and insertion of the various component into the casing. In FIG. 3, one cell 32 is illustrated, along with an individual cell liner 50 that may serve to surround each cell in the stack. Also better illustrated in FIG. 3 is an additional pressure pad 52 that is designed to fit on a side of the stack of cells opposite the shims 42 and 44 illustrated in FIG. 2. This pad may be made of resilient material, such as rubber foam, and allows for forces exerted by the shims to be opposed and therefore to create a desired compression force on the stack of cells.

As described more fully below, and as illustrated generally in FIG. 3, the liner 14 generally comprises a series of panels 54 that will surround the battery cells and fit within the external casing 12. In the presently contemplated embodiment, these panels are formed by expanses of sheet material joined by folds 56 at the corners. In an alternative configuration, the liner could be molded, glued or welded, or otherwise formed or assembled. The liner itself thus encloses and interior volume 58 into which the cells and any other internal components are mounted. This entire assembly, then, is placed into an entry volume 60 of the external casing 12. As noted above, in the illustrated embodiment one face, in this case the top of the casing 12 forms and open end 62 through which the entire assembly may be inserted.

Figure 4:
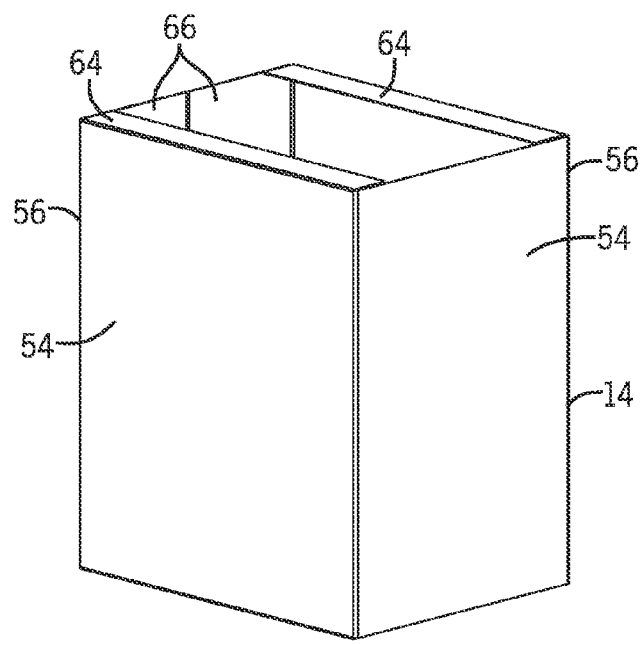
FIG. 4 is a perspective view of the liner alone illustrated in the presently contemplated manner in which the liner is formed.
Figure 5:
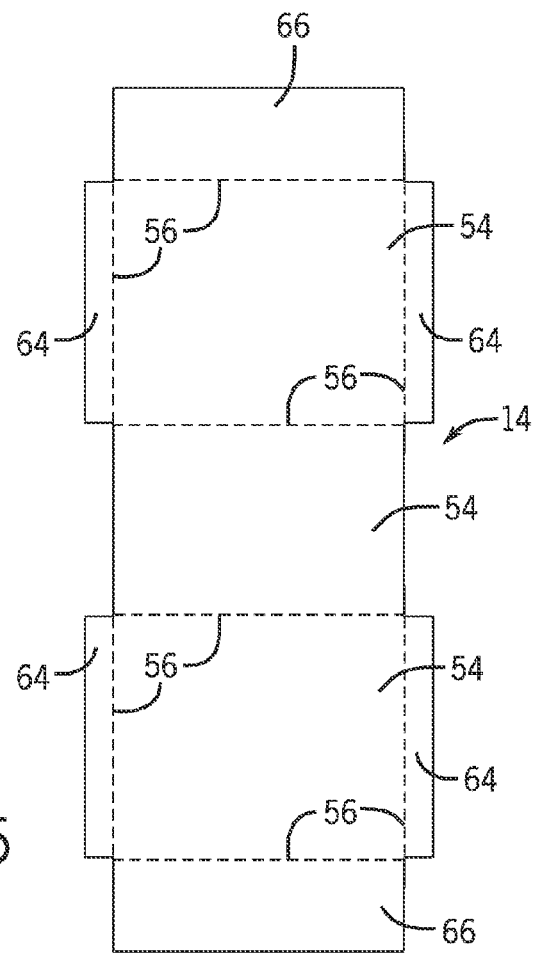
FIG. 5 is a plan view of an exemplary sheet material cut and formed to permit folding to form the liner.

FIGS. 4 and 5 illustrate a presently contemplated arrangement for forming the interior liner 14. As noted above, the liner may be formed of a sheet material, such as polypropylene. The liner allows for enclosing and protecting the battery cells, isolation from the external environment, as well as insulation of the liner and internal components from the external casing, particularly when the casing is made of a metal. In the embodiment illustrated in FIG. 4, the panels 54 of the liner are dimensioned to correspond to the combined dimensions of the internal components, particularly the battery cells and their separate casing when utilized. Upper and lower flanges 64 may be provided for covering corners of the battery cell stack. In the illustrated embodiment, one side of the liner is formed by facing panels 66 which are folded over and either approach one another, as shown, or may close or overlap. Where desired, mating faces may be glued or welded as mentioned above. FIG. 5 illustrates a sheet material used for the liner prior to folding. As noted, panels 54 and 66 are formed by virtue of the layout of the sheet material. Flanges 64 extend from the central region, and all of the panels are configured to allow easy folding along fold lines 56 that become the corners of the liner.

FIGS. 6A and 6B illustrate the exterior casing 12 at somewhat greater detail. As noted above, the casing may be made of a metallic material which may be stamped, bent, soldered, welded or otherwise worked. As will be appreciated by those skilled in the art, the use of such materials and processes greatly facilitates the fabrication and customization of the casing to different form factors, formats, mounting structures, and demands of original equipment manufacturers. That is, the casing need not be molded, and costly molds, dies and tooling need not be developed as in current battery systems. Shorter runs and adaptations may be made based upon demands of the application and the casing may be simply adapted to those requirements. Here again, the sides of the casing may form ribs 24 that aid in providing structural rigidity, particularly around openings 22 that reduce weight. Such openings may be provided in one or more of the faces of the structure. The inclusion of tabs 26 and 46, and openings 28 also greatly facilitate the flexibility in design and mounting of the structure as well as the compression of the internal components as described above. Certain of the panels may be added and semi-permanently or temporarily attached, such as panel 68 illustrated in FIG. 6B. Here a closure or rear wall of the casing is added and provision is made for receiving it and connecting it structurally with the interfacing walls of the casing.

FIGS. 7A, 7B and 7C illustrate the battery module in different orientations, to demonstrate the flexibility of the cage-like metallic casing in adapting to different mounting requirements, form factors, and so forth. As discussed above, certain tabs, brackets and so forth may be formed into one or more of the sides or corners of the casing. These may be designed to be bent outwardly for mounting. Alternatively, the structure lends itself well to the use of additional hardware, brackets and the like to permit securement to surrounding structures and to other battery modules. In the embodiments illustrated in FIGS. 7A, 7B and 7C, for example, a bracket B is secured to different locations on the casing to allow for such versatility in mounting.

As noted above, the battery module described may be adapted to utilize one or more separate assemblies of the type described. According to an exemplary embodiment, the battery module includes a plurality of battery modules (such as horizontal and vertical battery module) that contain individual electrochemical cells or batteries. The battery module also includes features or components for connecting the battery modules and/or electrochemical cells to each other and/or to other components of the vehicle electrical system, and also for regulating the electrochemical cells and other features of the battery system. For example, the battery system may include features that are responsible for monitoring and controlling the electrical performance of the system, managing the thermal behavior of the system, containment and/or routing of effluent (e.g., gases that may be vented from a battery cell), and other aspects of the battery system.

According to certain exemplary embodiments, each of the battery modules within the battery system includes a plurality of electrochemical. For example, these may comprise lithium-ion cells, nickel-metal-hydride cells, lithium polymer cells, etc., or other types of electrochemical cells now known or hereafter developed, as mentioned above. Furthermore, the battery system may also include a plurality of cell supervisory controllers (CSCs) that are configured to monitor and/or regulate at least a portion of the individual cells of the battery modules. According to an exemplary embodiment, each CSC may be mounted on a member or trace board (e.g., a printed circuit board). The trace board includes the necessary wiring to connect the CSC to the individual cells and to connect the CSC to the battery management system (BMS) or electronic control unit (ECU) of the battery system. The trace board includes various connectors to make these connections possible (e.g., temperature connectors, electrical connectors, voltage connectors, etc.). According to one exemplary embodiment, a single CSC is associated with each individual battery system. However, according to other exemplary embodiments, the CSCs may be otherwise connected to other modules and/or cells. Each CSC may be located adjacent the specific module it is associated with (e.g., on top or on the side of the module the CSC is controlling).

Figure 8:
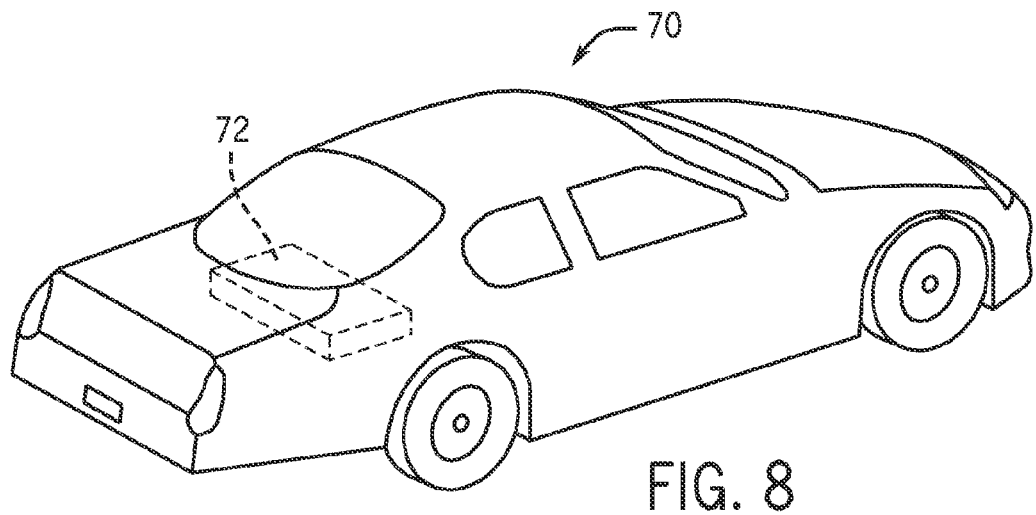
FIGS. 8 and 9 are illustrations of a vehicular application in which the battery system may be utilized.

As noted above, the battery module described may be used in a wide range of applications, and is particularly well suited to vehicular settings. Moreover, the battery module may comprise a range of energy storage technologies. By way of example, FIG. 8 is a perspective view of a vehicle 70 in the form of an automobile (e.g., a car) having a battery module 72 for providing all or a portion of the motive power for the vehicle 70. The battery module 72 may comprise one of more of the modules described above, with the casing, liner, and internal components being adapted for the particular vehicle and its mounting and electrical requirements. Such a vehicle 70 can be a conventional internal combustion engine-driven vehicle, an electric vehicle (EV), a hybrid electric vehicle (HEV), a plug-in hybrid electric vehicle (PHEV), or other type of vehicle using electric power for propulsion (collectively referred to as "electric vehicles").

For the purposes of the present disclosure, it should be noted that the module described is particularly directed to applications in providing and/or storing energy in xEV electric vehicles. As will be appreciated by those skilled in the art, hybrid electric vehicles (HEVs) combine an internal combustion engine propulsion and high voltage battery power to create traction. A plug-in electric vehicle (PEV) is any vehicle that can be charged from an external source of electricity, such as wall sockets, and the energy stored in the rechargeable battery packs drives or contributes to drive the wheels. PEVs are a subcategory of electric vehicles that include all-electric or battery electric vehicles (BEVs), plug-in hybrid vehicles (PHEVs), and electric vehicle conversions of hybrid electric vehicles and conventional internal combustion engine vehicles. An electric vehicle (EV) is an all-electric vehicle that uses for its propulsion one or more motors powered by electric energy. The term "xEV" is defined herein to include all of the foregoing or any variations or combinations thereof that include electric power as a motive force.

Although the vehicle 70 is illustrated as a car in FIG. 8, the type of vehicle may differ according to other exemplary embodiments, all of which are intended to fall within the scope of the present disclosure. For example, the vehicle 70 may be a truck, bus, industrial vehicle, motorcycle, recreational vehicle, boat, or any other type of vehicle that may benefit from the use of electric power for all or a portion of its propulsion power.

Further, although the battery module 72 is illustrated in FIG. 8 as being positioned in the trunk or rear of the vehicle, according to other exemplary embodiments, the location of the battery module 72 may differ. For example, the position of the battery module 72 may be selected based on the available space within or underneath a vehicle, the desired weight balance of the vehicle, the location of other components used with the battery module 72 (e.g., battery management modules, vents, or cooling devices, etc.), and a variety of other considerations.

Figure 9:
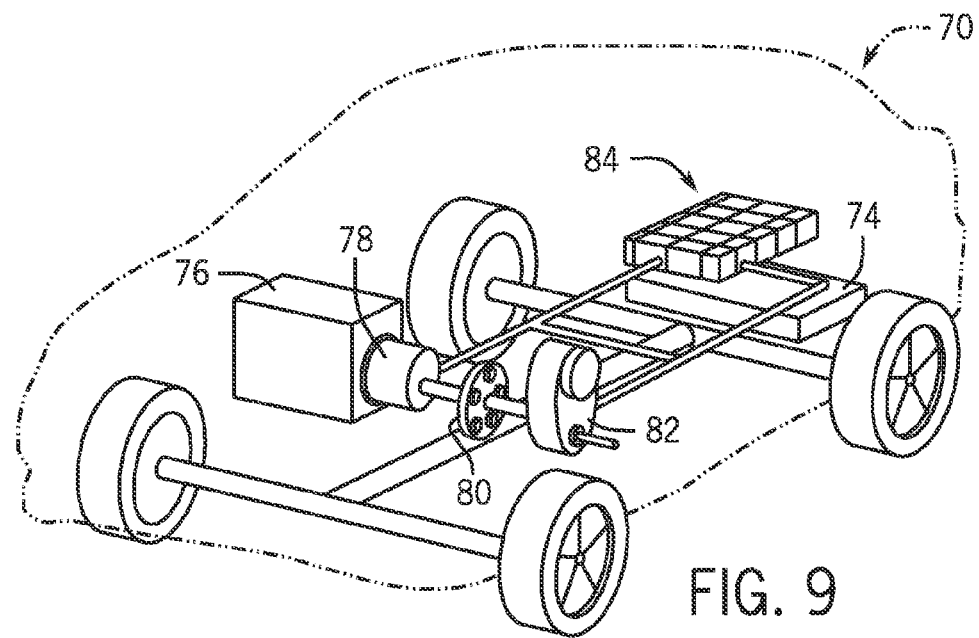

FIG. 9 illustrates a cutaway schematic view of a vehicle 70 provided in the form of an HEV according to an exemplary embodiment. A battery module 72 is provided toward the rear of the vehicle 70 proximate a fuel tank 74 (the battery module 72 may be provided immediately adjacent the fuel tank 74 or may be provided in a separate compartment in the rear of the vehicle 70 (e.g., a trunk) or may be provided elsewhere in the vehicle). An internal combustion engine 76 is provided for times when the vehicle 70 utilizes gasoline power to propel the vehicle. An electric motor 78, a power split device 80, and a generator 82 are also provided as part of the vehicle drive system.

Such a vehicle 70 may be powered or driven by just the battery module 72, by just the engine 76, or by both the battery module and the engine. It should be noted that other types of vehicles and configurations for the vehicle drive system may be used according to other exemplary embodiments, and that the schematic illustration of FIG. 9 should not be considered to limit the scope of the subject matter described in the present application. According to various exemplary embodiments, the size, shape, and location of the battery module 72 the type of vehicle 70 the type of vehicle technology (e.g., EV, HEV, PEV, PHEV, BEV, xEV, etc.), and the battery chemistry, among other features, may differ from those shown or described.

The invention claimed is:

1. A vehicle battery module comprising:
   a metallic external casing comprising three or more sides, wherein the external casing comprises a cage structure;
   an insulative liner disposed in the external casing;
   a plurality of prismatic energy storage cells disposed in the liner and configured to provide power for operation of the electric vehicle, wherein the three or more sides extend from a base of the external casing to a cover of the battery module to surround the liner and the plurality of prismatic energy storage cells; and
   at least one compression element disposed between the external casing and the plurality of prismatic energy storage cells and configured to urge the plurality of prismatic energy storage cells towards one another.

2. The battery module of claim 1, wherein the external casing comprises a metallic material formed by stamping and bending.

3. The battery module of claim 2, wherein the external casing has a nominal thickness of between approximately 0.5 mm and 1.5 mm.

4. The battery module of claim 1, wherein the external casing comprises at least one open face through which the liner and the plurality of prismatic energy storage cells are inserted.

5. The battery module of claim 1, wherein the external casing comprises an opening in at least one face to reduce weight of the external casing.

6. The battery module of claim 1, wherein the external casing comprises at least one tab configured to facilitate securement of the battery module to other battery modules of similar configuration.

7. The battery module of claim 6, wherein the external casing comprises at least one aperture configured to receive the at least one tab to allow for securement of the battery module to an additional battery module.

8. The battery module of claim 1, wherein the liner is made of a single sheet of insulative material.

9. The battery module of claim 1, wherein the liner comprises polypropylene.

10. The battery module of claim 1, wherein the liner has a nominal thickness of between approximately 0.2 mm and 1.0 mm.

11. The battery module of claim 1, wherein the liner is formed by cutting a sheet of insulative material and folding the cut sheet to conform generally to the external casing.

12. The battery module of claim 1, comprising a bus structure configured to interface with terminals of the plurality of prismatic energy storage cells to at least partially combine outputs of the plurality of prismatic energy storage cells.

13. The battery module of claim 1, comprising a thermal component configured to remove heat from and/or inject heat into the plurality of prismatic energy storage cells.

14. The battery module of claim 13, wherein the thermal component is secured to the external casing.

15. The battery module of claim 14, wherein the external casing comprises a retaining structure configured to allow the thermal component to be slid into an assembled position.

16. The battery module of claim 15, wherein the retaining structure comprises a groove.

17. A vehicle battery module comprising:
a stamped and bent metallic external casing comprising three or more sides, wherein the external casing comprises a cage structure;
an insulative liner disposed in the external casing;
a plurality of prismatic lithium technology energy storage cells disposed in the liner and configured to provide power for operation of the electric vehicle, wherein the three or more sides surround the liner and the plurality of prismatic lithium technology energy storage cells;
a bus structure configured to interface with terminals of the plurality of prismatic lithium technology energy storage cells to at least partially combine outputs of the plurality of prismatic lithium technology energy storage cells; and
a compression element disposed between an interior wall of the external casing and one or more prismatic lithium technology energy storage cells of the plurality of prismatic lithium technology energy storage cells and configured to urge the plurality of prismatic lithium technology energy storage cells towards one another, wherein the compression element comprises a resilient material that opposes forces exerted by the external casing on the plurality of prismatic lithium technology energy storage cells.

18. The battery module of claim 17, wherein the external casing has a nominal thickness of between approximately 0.5 mm and 1.5 mm.

19. The battery module of claim 17, wherein the external casing comprises at least one open face through which the liner and energy storage cells are inserted.

20. The battery module of claim 17, wherein the external casing comprises an opening in at least one face to reduce weight of the external casing.

21. The battery module of claim 17, wherein the external casing comprises at least one tab configured to facilitate securement of the battery module to other battery modules of similar configuration.

22. The battery module of claim 21, wherein the external casing comprises at least one aperture configured to receive the at least one tab to allow for securement of the battery module to an additional battery module.

23. The battery module of claim 17, wherein the liner is made of a single sheet of insulative material.

24. The battery module of claim 17, wherein the liner comprises polypropylene.

25. The battery module of claim 17, wherein the liner has a nominal thickness of between approximately 0.2 mm and 1.0 mm.

26. The battery module of claim 17, wherein the liner is formed by cutting a sheet of insulative material and folding the cut sheet to conform generally to the external casing.

27. A method for making a battery module, comprising:
forming a metallic external casing having apertures, ribs, and at least three walls defining an interior volume and a cage structure;
inserting an insulative liner into the interior volume of the external casing;
inserting a plurality of prismatic energy storage cells into the liner, wherein the at least three walls extend from a base of the external casing to a cover of the battery module to surround the liner and the plurality of prismatic energy storage cells; and
inserting at least one compression element between the external casing and the plurality of prismatic energy storage cells, wherein the at least one compression element is configured to urge the plurality of prismatic energy storage cells towards one another.

28. The method of claim 27, comprising forming on the external casing at least one tab configured to facilitate securement of the battery module to other battery modules of similar configuration.

29. The method of claim 28, comprising forming in the external casing at least one aperture configured to receive the at least one tab to allow for securement of the battery module to an additional battery module.

30. A vehicle, comprising:
a drive train configured to propel the vehicle in operation; and
an energy storage assembly coupled to the drive train and comprising at least one battery module comprising a metallic external casing that includes at least three walls, an insulative liner disposed in the external casing, a plurality of prismatic energy storage cells disposed in the liner and configured to provide power for propulsion of the electric vehicle, and at least one compression element disposed between the external casing and the plurality of prismatic energy storage cells and configured to urge the plurality of prismatic energy storage cells towards one another, wherein the external casing comprises a cage structure, and wherein the at least three walls extend from a base of the external casing to a cover of the battery module to surround the liner and the at least one plurality of prismatic energy storage cell.

31. The electric vehicle of claim 30, comprising an internal combustion engine coupled to the energy storage assembly, to the drive train, or both.

32. A lithium technology battery module comprising:
a metallic external casing comprising at least three walls;
an insulative liner disposed in the external casing;
a plurality of prismatic lithium technology energy storage cells disposed in the liner and configured to power operation of an electric vehicle, wherein the at least three walls surround the liner and the plurality of prismatic lithium technology energy storage cells;
a bus structure configured to interface with terminals of the plurality of prismatic lithium technology energy storage cells to provide power for operation of the electric vehicle and to at least partially combine outputs of the energy storage cells; and
a compression element disposed between an interior wall of the casing and one or more prismatic lithium technology energy storage cells of the plurality of prismatic lithium technology energy storage cells and configured to urge the plurality of prismatic lithium technology energy storage cells towards one another, wherein the compression element comprises a shim having a tapered wedge form that compresses the plurality of prismatic lithium technology energy storage cells when inserted into the module.

* * * * *

UNITED STATES PATENT AND TRADEMARK OFFICE
CERTIFICATE OF CORRECTION

PATENT NO. : 9,859,532 B2  
APPLICATION NO. : 13/434459  
DATED : January 2, 2018  
INVENTOR(S) : Mikhail S. Balk, Richard M. DeKeuster and Binbin Fan Page 1 of 1

It is certified that error appears in the above-identified patent and that said Letters Patent is hereby corrected as shown below:

In the Drawings

1. In Fig. 9, Sheet 6 of 6, delete Tag "84" and insert Tag -- 72 --, therefor.

In the Specification

2. In Column 2, Line 43, delete "DRAWINGS" and insert -- BRIEF DESCRIPTION OF DRAWINGS --, therefor.

3. In Column 5, Line 37, delete "and interior" and insert -- an interior --, therefor.

4. In Column 5, Line 41, delete "and open" and insert -- an open --, therefor.

5. In Column 7, Lines 19-20, delete "one of more" and insert -- one or more --, therefor.

6. In Column 7, Lines 39-40, delete "plug-in hybrid vehicles" and insert -- plug-in hybrid electric vehicles --, therefor.

Signed and Sealed this  
Thirty-first Day of July, 2018

Andrei Iancu  
*Director of the United States Patent and Trademark Office*